United States Patent [19]
Hughes et al.

[11] 3,946,383
[45] Mar. 23, 1976

[54] MONOPULSE PULSE WIDTH DISCRIMINATOR

[75] Inventors: Richard Smith Hughes; Robert E. Atkinson, both of China Lake, Calif.

[73] Assignee: The United States of America as represented by the Secretary of the Navy, Washington, D.C.

[22] Filed: June 22, 1970

[21] Appl. No.: 48,785

[52] U.S. Cl. ......... 343/7 A; 343/16 M; 343/17.1 R; 328/111; 328/115
[51] Int. Cl.² ............................................. G01S 9/22
[58] Field of Search ........... 343/7 A, 17.1 R, 16 M; 328/109, 110, 111, 115

[56] References Cited
UNITED STATES PATENTS

| 3,185,983 | 5/1965 | Parquier | 343/17.1 R |
| 3,487,405 | 12/1969 | Molho et al. | 343/7 A |

Primary Examiner—Malcolm F. Hubler
Assistant Examiner—G. E. Montone
Attorney, Agent, or Firm—R. S. Sciascia; Roy Miller; Robert W. Adams

[57] ABSTRACT

A monopulse pulse width discriminator for differentiating between input signals on the basis of pulse width and amplitude, having discriminator and timing circuits which outputs gate a video track loop fed by the modified input signal.

6 Claims, 3 Drawing Figures

MONOPULSE PULSE WIDTH DISCRIMINATOR

GOVERNMENT INTEREST

The invention described herein may be manufactured and used by or for the Government of the United States of America for governmental purposes without the payment of any royalties thereon or therefor.

BACKGROUND OF THE INVENTION

In the field of monopulse radar receivers all prior devices are unable to pulse width discriminate on instantaneous pulses. The present invention provides monopulse radar receivers with this ability.

DESCRIPTION OF THE PREFERRED EMBODIMENT

Figure 1:
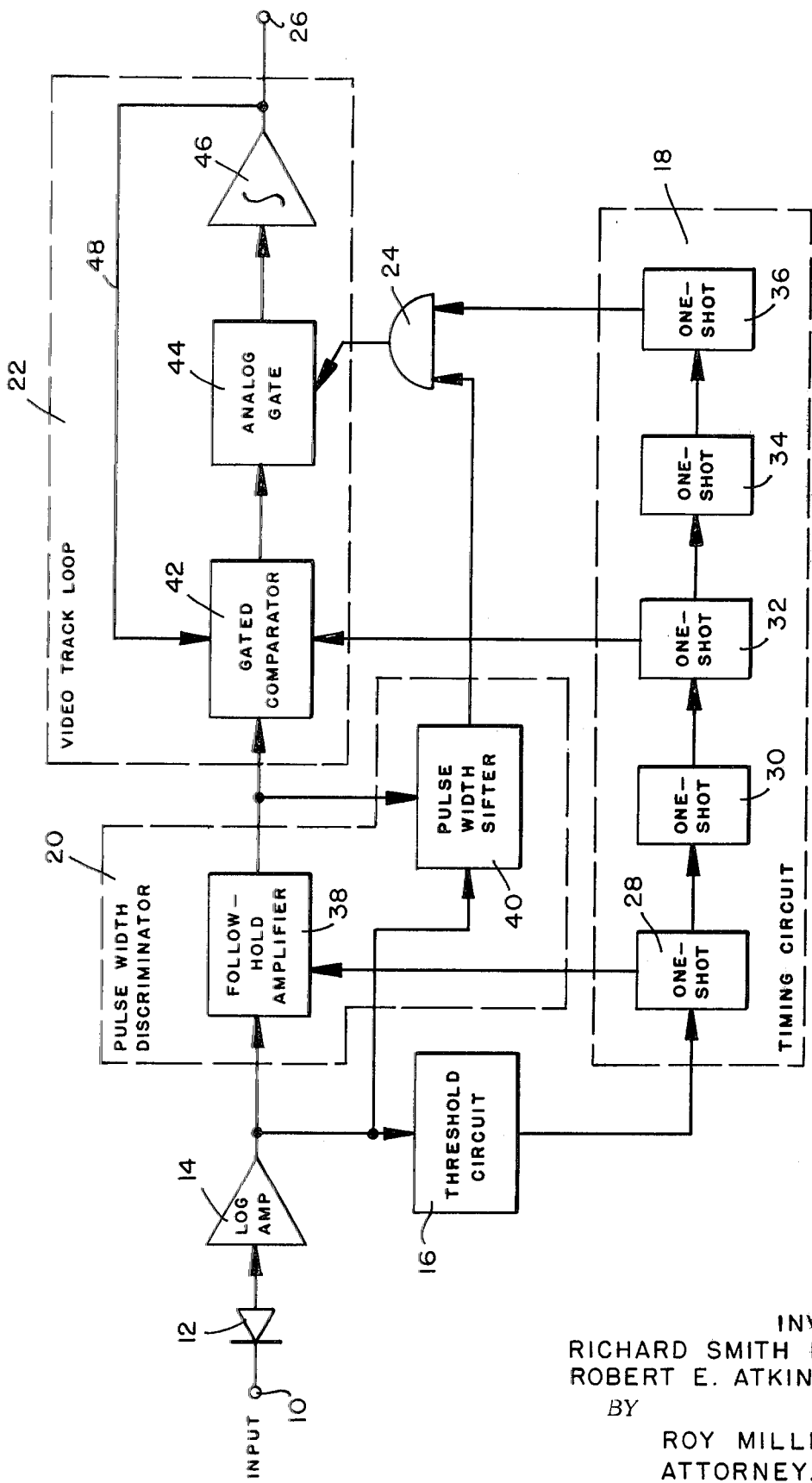
FIG. 1 is a block diagram of the preferred embodiment.

Referring now to FIG. 1, an RF energy input is coupled in at input 10 to the input of a logarithmic amplifier 14. The input to amplifier 14 is screened by diode detector 12. The output of logarithmic amplifier 14 is coupled to threshold circuit 16, which allows only pulses above a predetermined amplitude to trigger timing circuit 18, and pulse width discriminator 20.

Pulse width discriminator 20 consists of a follow-hold amplifier 38, which effectively holds or stretches the output pulse from logarithmic amplifier 14, and pulse width sifter 40, which provides an output signal only when the input pulse has a pulse width greater than the discriminator's reference pulse width. Pulse width discriminator 20 is fully disclosed in U.S. Pat. 3,611,157, by Richard S. Hughes. Follow-hold amplifier 38 can be considered to perform a similar function to that disclosed for peak detector 12 in the copending application.

The output of follow-hold amplifier 38 is coupled to pulse width sifter 40 and video track loop 22. Loop 22 is a conventional circuit utilized in radar receivers and, therefore, will not be discussed in detail. Its function, however, in respect to the invention will be mentioned.

The output of follow-hold amplifier 38 is compared in gated comparator 42 with a direct current amplitude level; i.e., the output of integrator 46; which is dependent on the last pulse accepted by the video track loop 22. The output of the gated comparator 42 is then coupled to analog gate 44 and passed by gate 44 only if AND gate 24 is "opened" by simultaneous signals from pulse width sifter 40 and one-shot multivibrator 36 in timing circuit 18. If the input pulse width is narrower than the pulse width discriminator's reference pulse width, AND gate 24 will not operate to open analog gate 44. Therefore, a pulse having a narrow pulse width will not be coupled to integrator 46 and will not update the video track loop direct current amplitude level.

Figures 2, 3:
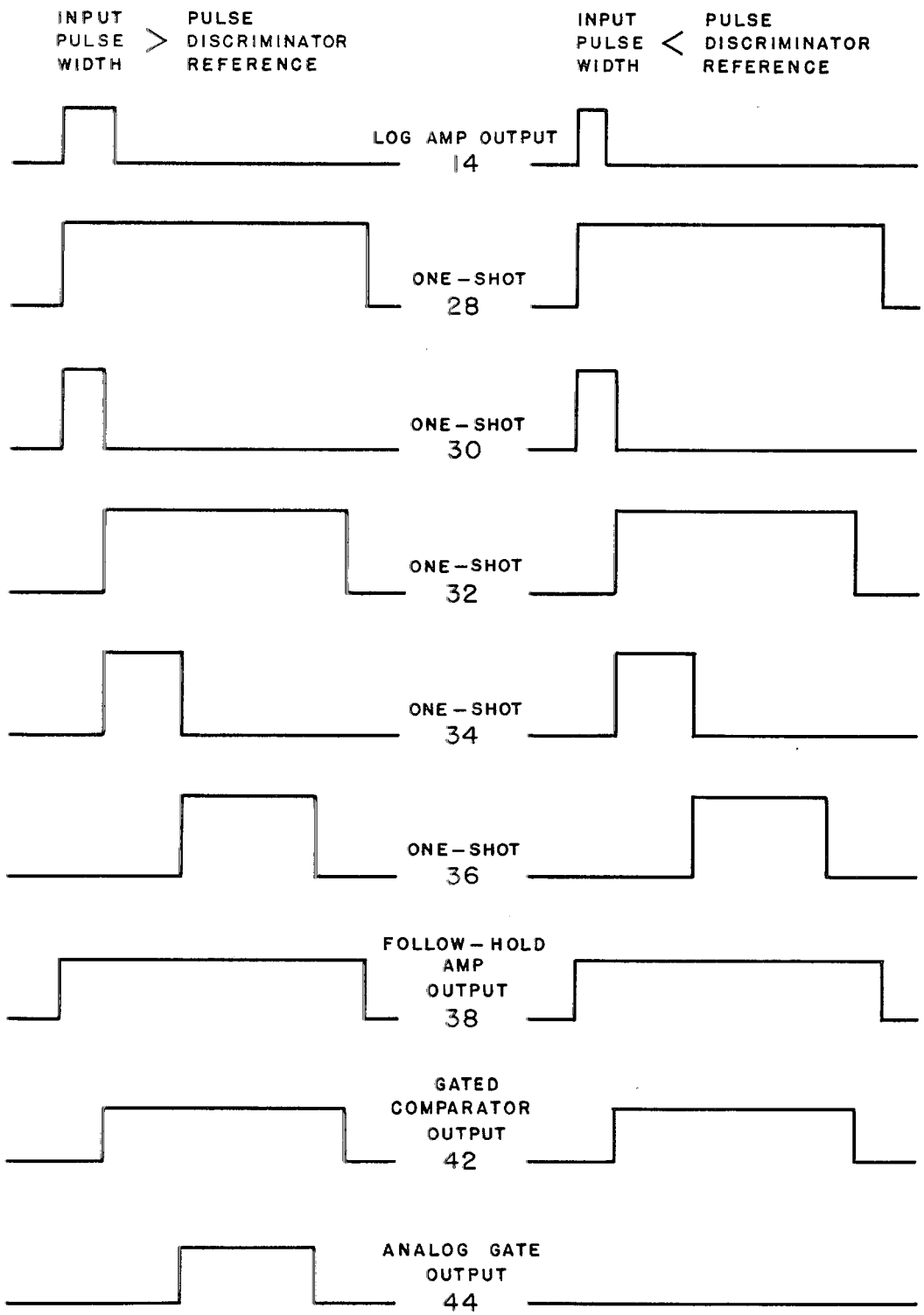
FIG. 2 is the wave-form diagram when the input pulse width > the discriminator's reference pulse width.
FIG. 3 is the wave-form diagram when the input pulse width < the discriminator's reference pulse width.

Timing circuit 18 consists of five one-shot multivibrators which operate, as best seen in FIGS. 2 and 3, to time the system's operation. One-shot multivibrator 28 gates follow-hold amplifier 38 and triggers one-shot multivibrator 30. One-shot multivibrator 30 after a delay triggers multivibrator 32 which in turn gates gated comparator 42 and triggers one-shot multivibrator 34. One-shot 34, after a delay sufficient for pulse width discriminator 20 to complete its operation, triggers one-shot 36. The output of one-shot 36 is coupled to AND gate 24.

The operation of the system when the input pulse width is greater than the discriminator's reference pulse width (FIG. 2) is as follows: The output from logarithmic amplifier 14 is fed to threshold circuit 16, which triggers timing circuit 18 only when the input pulse is above a predetermined amplitude, and pulse width discriminator 20. Assuming the input pulse is greater than the above mentioned predetermined amplitude, follow-hold amplifier 38 of pulse width discriminator 20 outputs a direct current signal to gated comparator 42 of video track loop 22. The output of integrator 46, which is dependent on the last pulse accepted by track loop 22, is fed back by coupling 48 as a reference level to gated comparator 42. Assuming the output from follow-hold amplifier 38 is greater than the fed back reference level, gated comparator 42 provides a direct current output to analog gate 44.

Since the input signal has a pulse width greater than the discriminator's reference and an amplitude greater than the threshold circuit's reference, pulse width sifter 40 and one-shot multivibrator 36 provide simultaneous outputs, opening AND gate 24 and analog gate 44. Therefore, the output of gated comparator 42 is coupled to integrator 46 which provides a system output at 26 and updates the video track loop direct current reference level.

The operation of the system when the input pulse width is less than the discriminator's reference pulse width (FIG. 3) differs from the above as follows: Pulse width sifter 40 of pulse width discriminator 20 does not provide a simultaneous output with one-shot multivibrator 36 to AND gate 24. Therefore, AND gate 24 and analog gate 44 remain closed, preventing the output of gated comparator 42 from reaching integrator 46. The output of integrator 46, therefore, remains as its previous direct current reference level.

What is claimed is:

1. An electronic system for differentiating between signals on the basis of pulse width and amplitude, comprising:
   input means adapted to receive an input signal;
   a logarithmic amplifier operatively connected to said input means and providing an output;
   discriminator means operatively connected to the output of said logarithmic amplifier for discerning the pulse width of said input signal relative to a reference, and for providing outputs from a first and second coupler wherein said first coupler provides an output only when the pulse width of said input signal is greater than said reference;
   timing means also operatively connected to the output of said logarithmic amplifier for providing timed signal outputs;
   gating means operatively connected to said first coupler and said timing means for providing a signal output only when signals are simultaneously received from said first coupler and said timing means; and
   a video track loop operatively connected to said second coupler and the output of said gating means, and providing the system output.

2. The system of claim 1 wherein said video track loop further comprises, means for accepting the output from said second coupler only when enabled by a signal output from said gating means.

3. The system of claim 1 wherein said discriminator means further comprises;

pulse peak detector means operatively connected to the output of said logarithmic amplifier and providing said second coupler output, for elongating said logarithmic amplifier output in the time domain so as to effectively stretch said input signal.

4. The system of claim 1 wherein said timing means further comprises;

a plurality of one-shot multivibrators providing timed signal outputs to said discriminator means, said gating means, and said video track loop.

5. The system of claim 1 wherein said video track loop further comprises;

a gated comparator operatively connected to said second coupler, an analog gate operatively connected to said gated comparator and said gating means, an integrator operatively connected to said analog gate and providing said system output, and feedback means operatively connected to said analog gate and said gated comparator for feeding back the output signal from said integrator.

6. A method for differentiating between signals on the basis of pulse width and amplitude, comprising;

receiving an input signal, logarithmic amplifying said input signal, discerning the pulse width of said input signal relative to a first reference, discerning the pulse amplitude of said input signal relative to a second reference, providing a circuit enabling signal only when said pulse width is greater than said first reference and said pulse amplitude is greater than said second reference, and outputting a circuit output including the current input signal only when said circuit enabling signal is provided.

* * * * *